(12) United States Patent
Karl

(10) Patent No.: US 9,695,880 B2
(45) Date of Patent: Jul. 4, 2017

(54) DRIVE ARRANGEMENT

(71) Applicant: Amtek Tekfor Holding GmbH, Offenburg (DE)

(72) Inventor: Christoph Karl, Schopfloch (DE)

(73) Assignee: Amtek Tekfor Holding GmbH, Offenburg (DE)

( * ) Notice: Subject to any disclaimer, the term of this patent is extended or adjusted under 35 U.S.C. 154(b) by 0 days.

(21) Appl. No.: 14/706,637

(22) Filed: May 7, 2015

(65) Prior Publication Data
US 2015/0323016 A1 Nov. 12, 2015

(30) Foreign Application Priority Data

May 8, 2014 (DE) .................. 10 2014 006 627

(51) Int. Cl.
| F16D 3/223 | (2011.01) |
| F16D 23/02 | (2006.01) |
| F16D 11/14 | (2006.01) |
| F16D 41/12 | (2006.01) |
| F16D 41/064 | (2006.01) |
| F16D 41/08 | (2006.01) |

(52) U.S. Cl.
CPC ............ F16D 3/223 (2013.01); F16D 11/14 (2013.01); F16D 23/02 (2013.01); F16D 41/125 (2013.01); F16D 41/086 (2013.01); F16D 2041/0646 (2013.01)

(58) Field of Classification Search
None
See application file for complete search history.

(56) References Cited

U.S. PATENT DOCUMENTS

| 4,061,216 A | 12/1977 | Sullivan et al. |
| 4,282,949 A | 8/1981 | Kopich et al. |
| 5,692,590 A | 12/1997 | Iihara et al. |
| 5,927,456 A | 7/1999 | Monahan et al. |
| 6,373,157 B1 | 4/2002 | Sekine |
| 6,881,107 B2 | 4/2005 | Roycroft |
| 2011/0275467 A1 | 11/2011 | Schmidt et al. |
| 2015/0240885 A1* | 8/2015 | Szentmihalyi .......... F16D 11/10 |
| | | 192/101 |

FOREIGN PATENT DOCUMENTS

| DE | 1 854 842 U | 7/1962 |
| DE | 25 49 581 C2 | 2/1982 |
| DE | 32 34 456 A1 | 3/1984 |

(Continued)

OTHER PUBLICATIONS

German Search Report dated Apr. 20, 2015 with partial English-language translation (thirteen (13) pages).

Primary Examiner — Robert A Siconolfi
Assistant Examiner — Ryan Dodd
(74) Attorney, Agent, or Firm — Crowell & Moring LLP

(57) ABSTRACT

A drive arrangement for a drive train of a vehicle is provided. The drive arrangement includes an outer hub, an inner hub and rolling elements. The outer hub includes a fixed section and a movable section which can be reversibly connected to one another. In the disconnected state, the movable section is freely rotatable about a longitudinal axis of the outer hub. The rolling elements are displaceable in a longitudinal direction of the outer hub between the fixed section and the movable section.

4 Claims, 3 Drawing Sheets

(56) References Cited

FOREIGN PATENT DOCUMENTS

| | | |
|---|---|---|
| DE | 10 2011 106 355 A1 | 1/2012 |
| DE | 10 2012 022 011 A1 | 5/2014 |
| DE | WO2014/072069 * 5/2014 | ............. B60K 17/22 |
| EP | 0 879 728 A2 | 11/1998 |
| GB | 2 255 380 A | 11/1992 |
| WO | WO 2010/069578 A1 | 6/2010 |

* cited by examiner

DRIVE ARRANGEMENT

This application claims priority under 35 U.S.C. §119 from German Patent Application No. 10 2014 006 627.4, filed May 8, 2014, the entire disclosure of which is herein expressly incorporated by reference.

BACKGROUND AND SUMMARY OF THE INVENTION

The invention relates to a drive arrangement for a drive train of a vehicle. The drive arrangement includes at least one outer hub having raceways, wherein the inner hub has raceways and wherein the inner hub is arranged at least partially within the outer hub.

The drive train of a vehicle transmits the force and the torque of an engine to the wheels of the vehicle.

In order to save fuel, or optionally electric energy in the case of an electric motor, there are vehicles which coast in the so-called coasting mode without being driven. However, in this operating state, the engine has a negative effect due to its braking drag torque so that decoupling between the engine and the wheels is sought, i.e., preferably in the area of the drive train.

A coupling arrangement for preventing torque transmission of a drive train to the wheels is described, for example, in U.S. Pat. No. 6,881,107 B2 or Great Britain Patent document no. GB 2 255 380 A. Each of them uses a joint. The basic structure of a joint for torque transmission is disclosed in German Patent publication no. DE 10 2011 106 355 A1, for example.

A switchable coupling for shafts, wherein torque transmission takes place via balls, is disclosed in German Patent publication no. DE 32 34 456 A1. The balls are located on a coupling part that is displaced axially so that the balls are located in a free space of a sleeve-shaped extension of a shaft.

A freewheel having locking ratchets to which force is applied by springs is known from German Patent publication no. DE 1 854 842.

International Patent publication no. WO 2010/069578 A1 describes a coupling arrangement with a differential through which a drive axle of a multi-axle driven vehicle can be connected.

According to the published patent application European Patent publication no. EP 0 879 728 A2, a planetary gear and a double disconnect mechanism serve for distributing a torque between both axles of a motor vehicle.

The couplings used in some cases in the prior art mostly involve increased installation space and increased weight.

It is an object of the invention to provide a drive arrangement as part of drive train which constitutes an alternative to the prior art and enables connecting and disconnecting the force and/or torque transmission.

The drive arrangement, in which the object derived and set forth above is achieved, is first and foremost characterized in that the outer hub has at least one fixed section and a movable section, that the fixed section and the movable section can be reversibly connected to one another, wherein in the disconnected state, the movable section is substantially freely rotatable about a longitudinal axis of the outer hub and that the rolling elements—in particular substantially along the longitudinal axis—are displaceable between the fixed section and the movable section.

The raceways in the inner and outer hubs each form pairs in which preferably in each case at least one rolling element is arranged.

The rolling elements are, for example, balls, rollers or barrels, wherein different types of rolling elements can also be combined with one another.

The drive arrangement according to the invention enables interrupting the torque transmission between a driving and a driven shaft. For this purpose, an outer hub and an inner hub are provided which, in the state installed in the vehicle, are correspondingly connected to the respective shaft of the drive train. Torque transmission between the two hubs takes place via the rolling elements which are arranged in raceways that are associated with one another.

The outer hub comprises at least two components: a fixed section and a movable section. Both sections are reversibly connected to one another so that they can also be decoupled from one another. In the decoupled state, the movable section is freely rotatable about a longitudinal axis of the outer hub.

Furthermore, in the decoupled state, a torque- and force transmission between the movable and fixed sections takes place that is preferably reduced with respect to the coupled state. In one configuration, substantially no torque- or force transmission takes place in the decoupled state, at least temporarily.

In one configuration, the fixed section is permanently connected to a shaft in a torque-transmitting manner. In another configuration, the inner hub is likewise permanently connected to a further shaft of the drive train in a torque-transmitting manner.

Furthermore, the rolling elements are freely displaceable between the movable section and the fixed section. When the rolling elements are situated axially in the region of the movable section in the case that the movable section and the fixed section are decoupled from one another, this results in the fact that the rolling elements are held between the inner hub and the movable section, but that no torque, or in one configuration at least only a reduced torque, is transmitted between the inner and the outer hubs.

The rotatability of the movable section about the longitudinal axis is in particular advantageous for optionally reestablishing the coupled state. In one configuration, this enables a torque adjustment for synchronization between the movable section and the fixed section. The rotatability of the movable section can optionally also be used for realigning the potentially twisted raceways so that the rolling elements can be displaced.

In one configuration, the rotatability of the movable section about the longitudinal axis can be limited to one direction. In a further configuration, the movable section can be rotated in both directions about the longitudinal axis.

As an alternative, the inner hub has a movable section and a fixed section.

In one configuration it is provided that the outer hub and the inner have a substantially fixed position relative to one another. In this configuration, the outer and inner hubs are not axially displaced relative to one another so that the arrangement relative to one another is maintained.

In one configuration it is provided that the rolling elements are arranged in windows of a cage and that the cage can be displaced between the fixed section and the movable section. By displacing the cage, the rolling elements are displaced as well. For example, a shift fork serves for displacing the cage so as to thereby move the rolling elements axially between movable and fixed sections. If the rolling elements are balls, the cage also keeps the balls in one plane.

One configuration provides that the movable section forms an end of the outer hub, which end faces towards the inner hub. The other end of the outer hub is preferably connected to a shaft of the drive train to receive or output a torque.

One configuration includes that the raceways of the outer hub and/or the raceways of the inner hub extend substantially parallel to the longitudinal axis. In this configuration, the raceways are formed to be in particular straight, parallel to one another and parallel to the longitudinal axis of the outer or inner hub. Thus, when the rolling elements are displaced in the raceways, they are also shifted along the longitudinal axis.

In one configuration, at least one ratchet device is provided for the reversible connection between the movable and fixed sections. In another configuration, a plurality of identical or different ratchet devices are provided.

In one configuration, the at least one ratchet device has at least one ratchet and a recess, wherein the ratchet is mounted to be rotatable at one end, and wherein the ratchet is dimensioned such that the ratchet protrudes, in at least one state, with a free end into the recess.

In one configuration, the ratchet is a rod that is mounted at one end to be rotatable about a bearing position and thus can be moved with a free end into and also out of a recess. This takes place via the rotation about the mounted end. If the ratchet is in the recess, this establishes in particular the connection between the movable and the fixed sections. In the case of a torque difference, the ratchet therefore abuts against a boundary of the recess and thus acts accordingly on the component, thus the movable or fixed section that carries the recess, or reversely, acts on the component that is associated with the ratchet.

In one configuration, the ratchet is associated with the movable or fixed section, and the recess is associated with the fixed or the movable section.

In one configuration, at least one spring element that applies a force onto the free end of the ratchet in the direction of the recess is provided as part of the ratchet device. In one configuration, the spring element pushes the free end of the ratchet into the recess and, in an alternative or additional configuration, prevents the free end from moving beyond a certain extent counter to the recess.

In one configuration it is provided that the ratchet is configured in such a manner and is mounted at least in alignment with the recess in such a manner that in at least one state, the component of the outer hub carrying the recess moves the ratchet out of the recess. Thus, in this configuration, the component of the outer hub, thus the movable or fixed section, ensures that the ratchet is moved out of the recess. For example, this can take place depending on a certain speed difference between the movable and fixed hubs or depending on the respective rotational directions of the two sections. This configuration therefore also effects a decoupling between movable and fixed sections.

In one configuration it is provided that the ratchet is arranged in a chamber of the fixed section and the recess is arranged in the movable section. The chamber likewise is a recess or indentation in which the ratchet can be received.

Other objects, advantages and novel features of the present invention will become apparent from the following detailed description of one or more preferred embodiments when considered in conjunction with the accompanying drawings.

DETAILED DESCRIPTION

Figure 1:
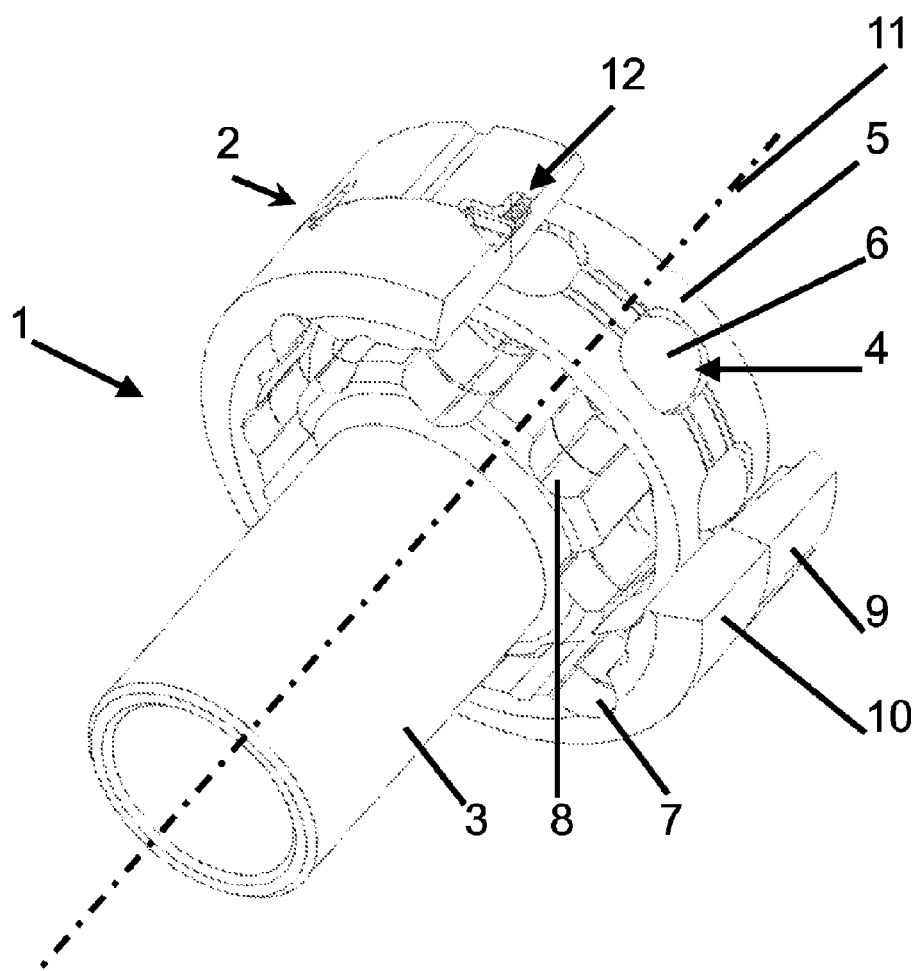
FIG. 1 shows a schematic illustration that explains the functional interactions of a drive arrangement according to an embodiment of the invention in a partial section in a first state.
Figure 2:
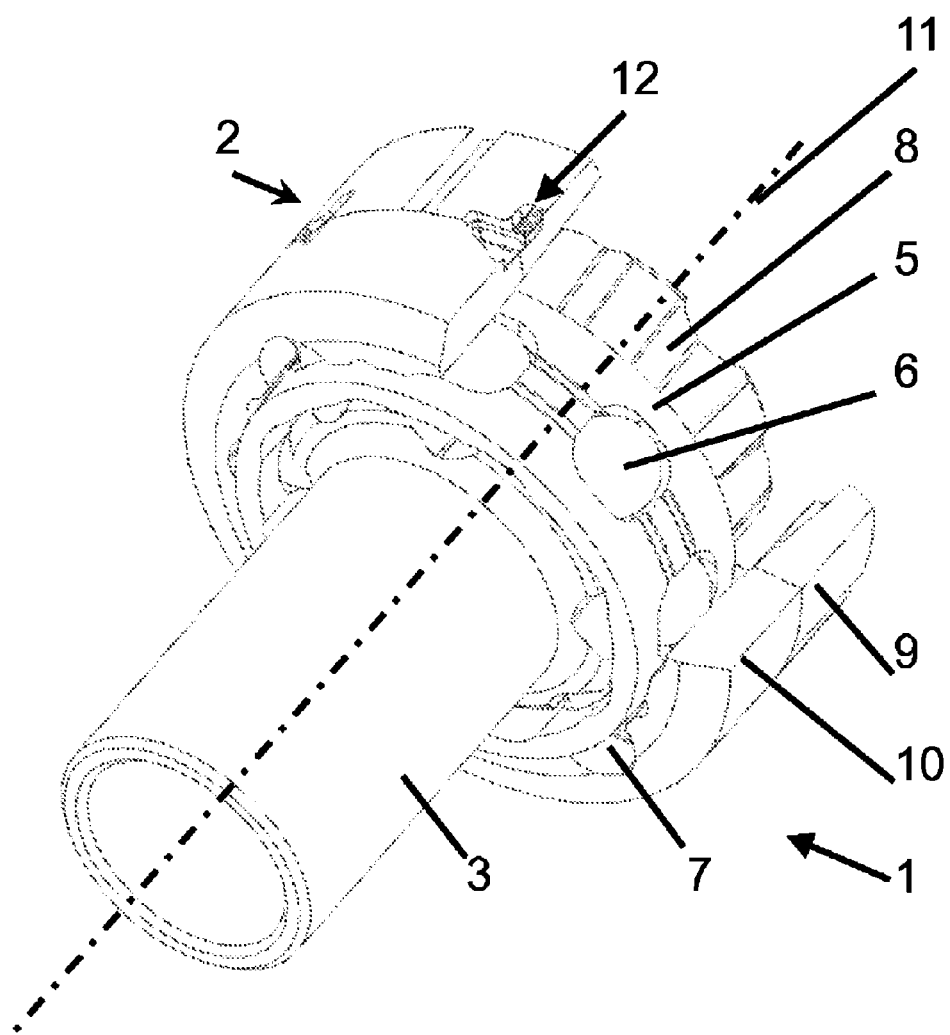
FIG. 2 shows the arrangement of FIG. 1 in a second state.
Figure 3:
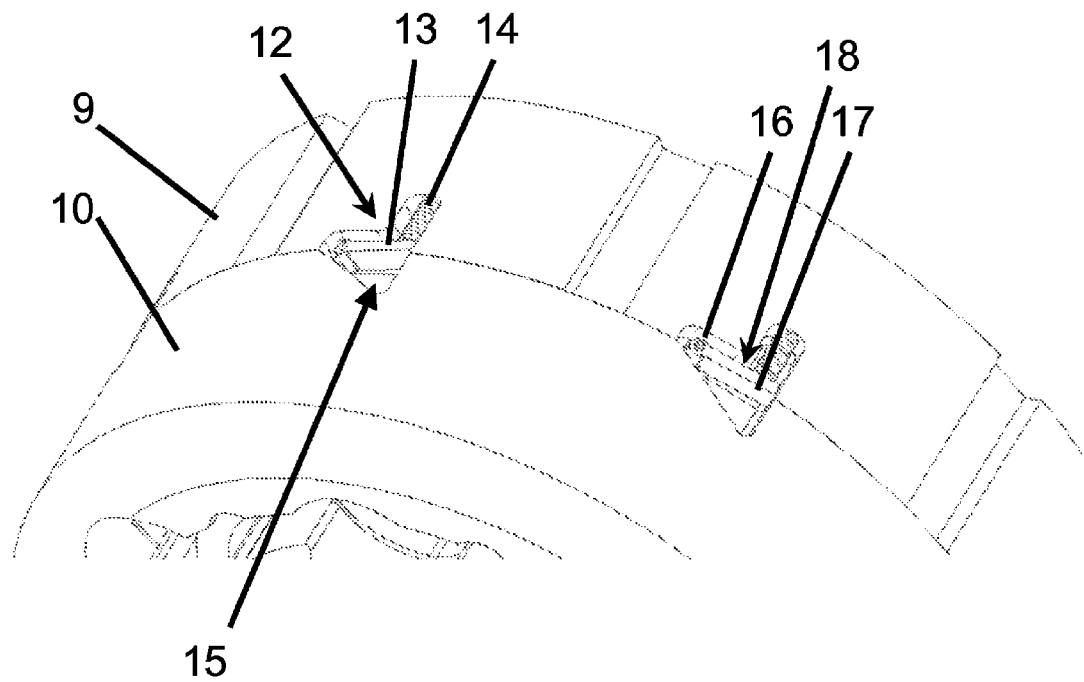
FIG. 3 shows an enlarged detail of the drive arrangement of FIG. 1.

FIGS. 1 to 3 illustrate an exemplary embodiment of a drive arrangement 1 according to the invention of a drive train of a vehicle. This concerns, for example, a drive train in the form of a longitudinal or lateral drive shaft. The drive arrangement 1 can be connected to further components, which are not illustrated here, such as transmission output shafts, differential gear output or input shafts, wheel hubs or the like. For example, length compensation elements, which are not shown here, can also be provided.

The drive arrangement 1 has an outer hub 2 and an inner hub 3, wherein the inner hub 3 is partially surrounded by the outer hub 2.

For transmitting the torque, a cage 5 provided with windows 4 is situated between the inner hub 3 and the outer hub 2. In the windows 4 there is in each case one ball 6 as an exemplary variant of a rolling element. Thus, overall, a joint is formed.

For the balls 6, the outer hub 2 is provided with raceways 7 which are suitably designed for the balls, and there are also raceways 8 in the inner hub 3. Here, the raceways 7, 8 are in each case straight and enable guiding and axially displacing the balls 6.

The outer hub 2 has a fixed section 9 and a movable section 10. With respect to torque transmission, the fixed section 9 is fixedly connected to a shaft of the drive train, which is not illustrated here.

The movable section 10 is reversibly connected to the fixed section 9 and in the disconnected state, the movable section is in particular freely rotatable about the longitudinal axis 11 of the outer hub 2, which is also the longitudinal axis of the drive arrangement 1 or the inner hub 3 here.

For enabling or preventing torque transmission between the outer hub 2 and the inner hub 3, the balls 6 are moved axially via the cage 5 along the longitudinal axis 11 and are therefore situated either in the region of the movable section 10 or in the region of the fixed section 9.

If the balls 6 are situated in the region of the fixed section 9, as shown in FIG. 1, torque transmission takes place.

For the transition from the state of FIG. 1 to the state of FIG. 2, the cage 5 is moved axially along the longitudinal axis 11 and therefore the balls 6 are also moved into the region of the movable section 10.

Displacing the balls 6 requires that the raceway portions of the movable section 10 and the fixed section 9 complement each other to form continuous raceways 7. However, this requires the same torque, which is in particular ensured by the fact that the radially and circumferentially arranged ratchet devices 12 provide in each case for the connection between the movable section 10 and the fixed section 9.

In FIG. 2, the balls 6 are axially at the height of the movable section 10 of the outer hub 2. When the ratchet devices 12 are disengaged, there is no torque coupling between the movable section 10 and the fixed section 9 so that the movable section 10 can freely rotate about the longitudinal axis 11 and that in particular no torque is transmitted via the balls 6 from the outer hub 2 to the inner hub 3 or vice versa.

Conversely, if torque transmission is to be reestablished or the balls 6 are to be brought again into the region of the fixed section 9, the movable section 10 and the fixed section 9 are synchronized with one another. This results again in completely continuous raceways 7 in the outer hub 2 which enable displacing the balls 6.

FIG. 3 shows an enlarged detail of the region between the fixed section 9 and the movable section 10. The ratchet devices 12 are shown.

Provided are in each case one ratchet 13, one spring element 14 and one recess 15. In the configuration shown, the ratchet 13 and the spring element 14 are situated on the fixed section 9 and the recess 15 is a part of the movable section 10. The ratchet 13 is rotatably mounted with one end 16 and thus can be inserted with its free end 17 into the recess 15.

The ratchet 13 and the spring element 14 are arranged in a chamber 18 of the fixed section 9. The spring element 14 acts against the free end 17 of the ratchet 13 in the direction of the recess 15.

Once the ratchet 13 is in the recess 15, the ratchet 13 abuts against the boundary of the recess 15 as a result of a certain speed difference between the movable section 10 and the fixed section 9. Conversely, the ratchet 13 is attached with the rotatably mounted end 16 so close to the edge of the fixed section 9 that at a different torque difference, the movable section 10 moves the ratchet 13 out of the recess 15 and moves or rotates it into the chamber 18.

Overall, this virtually results in a ratcheting freewheel in one rotational direction for a positive-locking fit between the two components 9, 10 of the outer hub.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A drive arrangement for a drive train of a vehicle, comprising:
    an outer hub having raceways aligned parallel with a longitudinal axis of the outer hub;
    an inner hub having raceways aligned parallel with the longitudinal axis; and
    rolling elements engaged with the raceways of the outer hub and the inner hub,
    wherein
    the outer hub has a fixed section and a movable section, the fixed section and the movable section each having portions of the outer hub raceways,
    the fixed section and the movable section are connectable to and disconnectable from one another,
    in a disconnected state the movable section is freely rotatable relative to the fixed section about the longitudinal axis,
    the rolling elements are displaceable along the longitudinal axis,
    in a connected state the movable section is rotationally fixed to the fixed section such that the outer hub raceway portions of the movable section and the fixed section are aligned in the longitudinal direction to form complete outer hub raceways along which the rolling elements are displaceable,
    at least one ratchet device arranged between the fixed section and the movable section, the at least one ratchet device having
        a ratchet with a first end rotatably mounted to one of the fixed section and the movable section and a free end arranged to protrude into a recess in the other of the fixed section and the movable section in the connected state, and
        a spring element arranged to bias the free end of the ratchet toward the recess.

2. The drive arrangement according to claim 1, wherein the rolling elements are arranged in windows of a cage, and
    the cage is displaceable along the longitudinal axis.

3. The drive arrangement according to claim 1, wherein the ratchet is configured such that
    relative motion about the longitudinal axis of the fixed section and the movable section in a first circumferential direction causes the ratchet to move out of the recess, and
    relative motion in a second circumferential direction opposite the first circumferential direction causes the ratchet to engage the recess such that the fixed section and the movable section are circumferentially rotationally fixed relative to one another.

4. The drive arrangement according to claim 1, wherein the ratchet is arranged in a chamber of the fixed section, and the recess is arranged in the movable section.

* * * * *